United States Patent
Yamamoto et al.

(10) Patent No.: US 10,008,843 B2
(45) Date of Patent: Jun. 26, 2018

(54) WIRE PROTECTION MEMBER

(71) Applicant: Yazaki Corporation, Minato-ku, Tokyo (JP)

(72) Inventors: Masataka Yamamoto, Makinohara (JP); Atsuyoshi Yamaguchi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days. days.

(21) Appl. No.: 15/019,075

(22) Filed: Feb. 9, 2016

(65) Prior Publication Data

US 2016/0156166 A1 Jun. 2, 2016

Related U.S. Application Data (63) Continuation of application No. PCT/JP2014/071899, filed on Aug. 21, 2014.

(30) Foreign Application Priority Data

Aug. 27, 2013 (JP) ................................. 2013-175641

(51) Int. Cl.
*H02G 3/00* (2006.01)
*H02G 3/32* (2006.01)
(Continued)

(52) U.S. Cl.
CPC ........... *H02G 3/26* (2013.01); *B60R 16/0215* (2013.01); *F16B 5/0685* (2013.01); *H02G 3/32* (2013.01); *F16B 21/086* (2013.01); *H02G 3/0468* (2013.01)

(58) Field of Classification Search
CPC .. H02G 3/30; H02G 3/36; H02G 3/32; H02G 3/34; H02G 3/0468; H02G 3/24;
(Continued)

(56) References Cited

U.S. PATENT DOCUMENTS 4,386,752 A 6/1983 Pavlak et al.
6,376,777 B1 4/2002 Ito et al.
(Continued)

FOREIGN PATENT DOCUMENTS

| JP | 2000-340052 A | 12/2000 |
| JP | 2010-133543 A | 6/2010 |
| JP | 2012-217295 A | 11/2012 |

OTHER PUBLICATIONS

Oct. 7, 2014—International Search Report—Intl App PCT/JP2014/071899.
(Continued)

*Primary Examiner* — Dimary Lopez Cruz
(74) *Attorney, Agent, or Firm* — Banner & Witcoff, Ltd.

(57) ABSTRACT

A wire protection member includes: a flexible cylindrical wire protection tube; a cylindrical covering member that is formed on an outer circumferential surface of the wire protection tube by molding; and a locking tool that is formed integrally with the cylindrical covering member to allow the locking tool to be locked to a mounting hole of a vehicle body panel. The cylindrical covering member includes: a thick portion that is formed to be thicker in radial thickness than another outer circumferential portion in a circumferential direction on which at least the locking tool is provided to protrude; and a flat surface or a gentle curved surface that is formed in an outer surface of the thick portion and that is substantially parallel to a plane passing through an axis of the wire protection tube.

6 Claims, 9 Drawing Sheets

(51) Int. Cl.
*B60R 16/02* (2006.01)
*F16B 5/06* (2006.01)
*F16B 21/08* (2006.01)
*H02G 3/04* (2006.01)

(58) Field of Classification Search
CPC ...... H02G 3/26; H02G 3/0481; H02G 3/0462; H02G 3/0406; H02G 3/045; F16B 21/086; F16B 21/06; F16L 3/12; F16L 3/08; F16L 3/26; F16L 3/23; F16L 3/13; F16L 11/122; B60R 16/0215
USPC ......... 174/68.3, 72 A, 135, 154; 248/71, 55, 248/73, 68.1, 74.5; 138/121
See application file for complete search history.

(56) References Cited

U.S. PATENT DOCUMENTS

| | | | | |
|---|---|---|---|---|
| 6,595,473 B2* | 7/2003 | Aoki | ................... | B60R 16/0215 138/108 |
| 6,668,865 B2* | 12/2003 | Miyamoto | .......... | B60R 16/0215 138/108 |
| 7,053,311 B2* | 5/2006 | Santanda | ................ | H02G 3/34 174/135 |
| 7,645,938 B2* | 1/2010 | Kogure | ............... | B60R 16/0215 174/68.1 |
| 8,020,812 B2 | 9/2011 | Matsuno et al. | | |
| 8,833,706 B2* | 9/2014 | Elsmore | ................... | H02G 3/32 138/106 |
| 2002/0000499 A1 | 1/2002 | Aoki et al. | | |
| 2004/0159454 A1* | 8/2004 | Shibuya | .............. | B60R 16/0215 174/545 |
| 2010/0148015 A1 | 6/2010 | Matsuno et al. | | |
| 2014/0027147 A1 | 1/2014 | Yamamoto et al. | | |
| 2015/0270690 A1 | 9/2015 | Yamamoto et al. | | |
| 2015/0270692 A1 | 9/2015 | Yamamoto et al. | | |

OTHER PUBLICATIONS

Dec. 29, 2016—(CN) Notification of the First Office Action—App 201480047443.4.
Apr. 25, 2017—(JP) Notification of Reasons for Refusal—App 2013-175641.
Aug. 24, 2017—(CN) The Second Office Action—App 201480047443.4.
Mar. 1, 2016—(WO) IPRP—App PCT/JP2014/071899.
Feb. 26, 2018—(CN) The Third Office Action—App 201480047443.4.

* cited by examiner

WIRE PROTECTION MEMBER

CROSS REFERENCE TO RELATED APPLICATION(S)

This application is a continuation of PCT application No. PCT/JP2014/071899, which was filed on Aug. 21, 2014 based on Japanese Patent Application (No. 2013-175641) filed on Aug. 27, 2013, the contents of which are incorporated herein by reference.

BACKGROUND OF THE INVENTION

1. Field of the Invention

The present invention relates to a wire protection member.

2. Description of the Related Art

A protection tube for preventing electric wires from touching another member to be thereby damaged is used in a wire harness provided in a car or the like. A locking tool to be locked to a mounting hole of a vehicle body panel where the electric wires should be wired is bound to an outer circumferential surface of the protection tube made of a synthetic resin material and having flexibility. However, the protection tube may be crushed at the place where the locking tool is bound with a binding band or the like. The electric wires may be bitten at the place where the protection tube is crushed. In addition, there arises a problem that a space to receive the electric wires may be reduced at the crushed place to thereby deteriorate the wire protection function.

Figure 9:
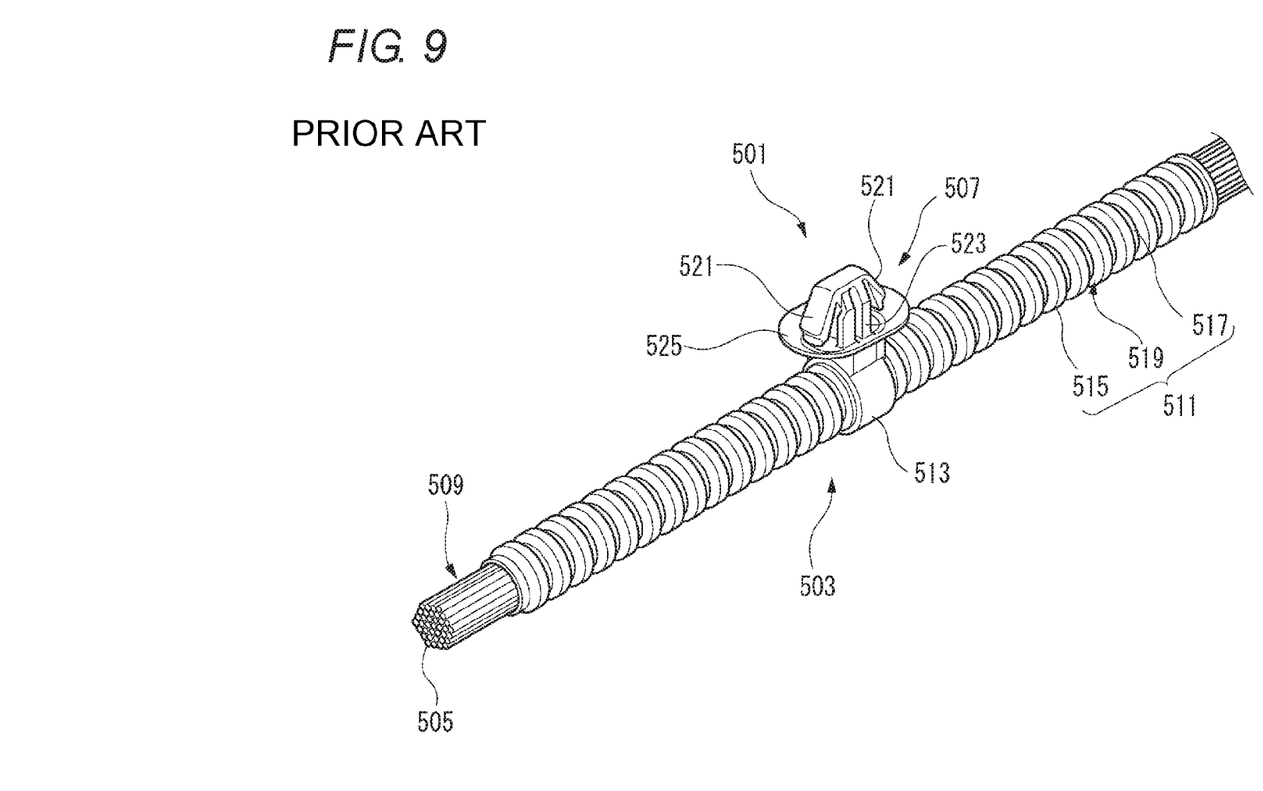
FIG. 9 is a perspective view of a protection tube with a locking tool in the background art.

Therefore, there has been proposed a protection tube with a locking tool (wire protection member), in which a locking tool that can be locked to a mounting hole of a vehicle body panel is formed integrally with a protection tube (see JP-A-2012-217295). As shown in FIG. 9, a wire harness 501 includes a protection tube 503 with a locking tool. In the protection tube 503 with a locking tool, a locking tool 507 to be locked to a mounting hole of a vehicle body panel where electric wires 505 should be wired is provided on the outer circumferential surface of a protection tube (wire protection tube) 511 formed into a cylindrical shape and receiving a wire bundle 509.

In the protection tube 503 with a locking tool, a cylindrical portion 513 serving as a cylindrical covering member formed into a cylindrical shape is provided on the outer circumferential surface of the protection tube 511. The protection tube 511 made of synthetic resin has flexibility (easy bendability) due to its configuration in which a plurality of large diameter portions 515 and a plurality of small diameter portions 517 are arranged alternately. Of the cylindrical portion 513 provided on the outer circumferential surface of the protection tube 511, parts formed on the inner side are filled into concave outer circumferential grooves 519 located between adjacent ones of the large diameter portions across each small diameter portion 517. Thus, the parts formed on the inner side are integrated with the protection tube 511. In the locking tool 507 provided in the cylindrical portion 513 configured thus, a pair of locking claws 521 are closed, and a shaft portion 523 is inserted into the mounting hole of the vehicle body panel. When an abutment plate 525 of the locking tool 507 abuts against the vehicle body panel, the pair of locking claws 521 are opened on the back side of the vehicle body panel such that the vehicle body panel is put between the locking claws 521 and the abutment plate 525. Thus, the locking tool 507 is locked to the vehicle body panel.

According to the protection tube 503 with a locking tool, the locking tool 507 is formed integrally with the protection tube 511. It is therefore unnecessary to bind the locking tool to the protection tube with a binding band as described above. Therefore, there is no fear that the protection tube 511 may be crushed due to binding with the binding band.

SUMMARY OF THE INVENTION

However, in the aforementioned background-art protection tube 503 with a locking tool, there is a fear that the cylindrical portion 513 may be crushed with the protection tube 511 due to a large pressing force applied thereto when the locking claws 521 are closed and the shaft portion 523 is inserted into the mounting hole of the vehicle body panel. On the other hand, when the thickness of the cylindrical portion 513 is increased all over its circumference, the increased thickness can prevent the cylindrical portion 513 from being easily crushed, but there arises another problem that the diameter of the cylindrical portion 513 is so large that the cylindrical portion 513 may interfere with another member or may be wired with difficulty.

The present invention has been developed in consideration of the aforementioned circumstances. An object of the invention is to provide a wire protection member that can be prevented from easily crushed, without enlarging a cylindrical covering member.

The aforementioned object of the invention is attained by the following configurations.

(1) A wire protection member including: a flexible cylindrical wire protection tube; a cylindrical covering member that is formed on an outer circumferential surface of the wire protection tube by molding; and a locking tool that is formed integrally with the cylindrical covering member to allow the locking tool to be locked to a mounting hole of a vehicle body panel, wherein the cylindrical covering member includes: a thick portion that is formed to be thicker in radial thickness than another outer circumferential portion in a circumferential direction on which at least the locking tool is provided to protrude; and a flat surface or a gentle curved surface that is formed in an outer surface of the thick portion and that is substantially parallel to a plane passing through an axis of the wire protection tube.

According to the wire protection member having the aforementioned configuration (1), the cylindrical covering member provided with the thick portion is hardly crushed, due to the thick portion serving as a bearing wall. In addition, only the thick portion provided in the cylindrical covering member protrudes from the outer circumferential surface of the cylindrical covering member more than any other outer circumferential portion. Therefore, enlargement of the cylindrical covering member is suppressed in comparison with the case where the cylindrical covering member is thickened all over its circumference. Further, the flat surface or the gentle curved surface that is substantially parallel to a plane passing through the axis of the wire protection tube is formed in the outer surface of the thick portion. Therefore, the thick portion has an external shape that does not protrude radially outward more than necessary, whereby the flat surface or the gentle curved surface can be also used as a pressing surface with which the locking tool is pressed into the mounting hole of the vehicle body panel or a seat surface with which the wire protection member is wired on the vehicle body panel.

Incidentally, the state "substantially parallel to a plane passing through the axis of the wire protection tube" is not limited to a perfect parallel state but may include a slightly inclined state. The "gentle curved surface" may include a curved surface or a spherical surface with a smaller curvature than the outer diameter of the wire protection tube.

(2) A wire protection member according to the aforementioned configuration (1), wherein the thick portion includes a pair of flat side surfaces that are perpendicular to the flat surface or the gentle curved surface and in contact with the outer circumferential surface of the cylindrical covering member.

According to the wire protection member having the aforementioned configuration (2), the thick portion is formed into a substantially rectangular shape in section by the flat surface or the gentle curved surface formed in the outer surface and the pair of flat side surfaces. Accordingly, the flat surface or the gentle curved surface and the flat side surfaces of the thick portion can be used as pressing surfaces or seat surfaces respectively.

(3) A wire protection member according to the aforementioned configuration (1) or (2), wherein the flat surface or the gentle curved surface is formed on an opposite side to the locking tool across the axis of the wire protection tube.

According to the wire protection member having the aforementioned configuration (3), the flat surface or the gentle curved surface of the thick portion is a surface substantially perpendicular to a direction in which the locking tool is pressed into the mounting hole of the vehicle body panel. Thus, the pressing-in force can efficiently act on the insertion force of the locking tool. Accordingly, the wire protection member can be fixed to the vehicle body panel easily without crushing the wire protection tube.

A wire protection member according to the invention can be prevented from being crushed easily, without enlarging a cylindrical covering member. The invention has been described briefly. Further, the details of the invention will be made clearer through the following mode for carrying out the invention (hereinafter referred to as "embodiment") with reference to the accompanying drawings.

DETAILED DESCRIPTION OF THE EXEMPLARY EMBODIMENTS

An embodiment of the invention will be described below with reference to the drawings.

Figure 1:
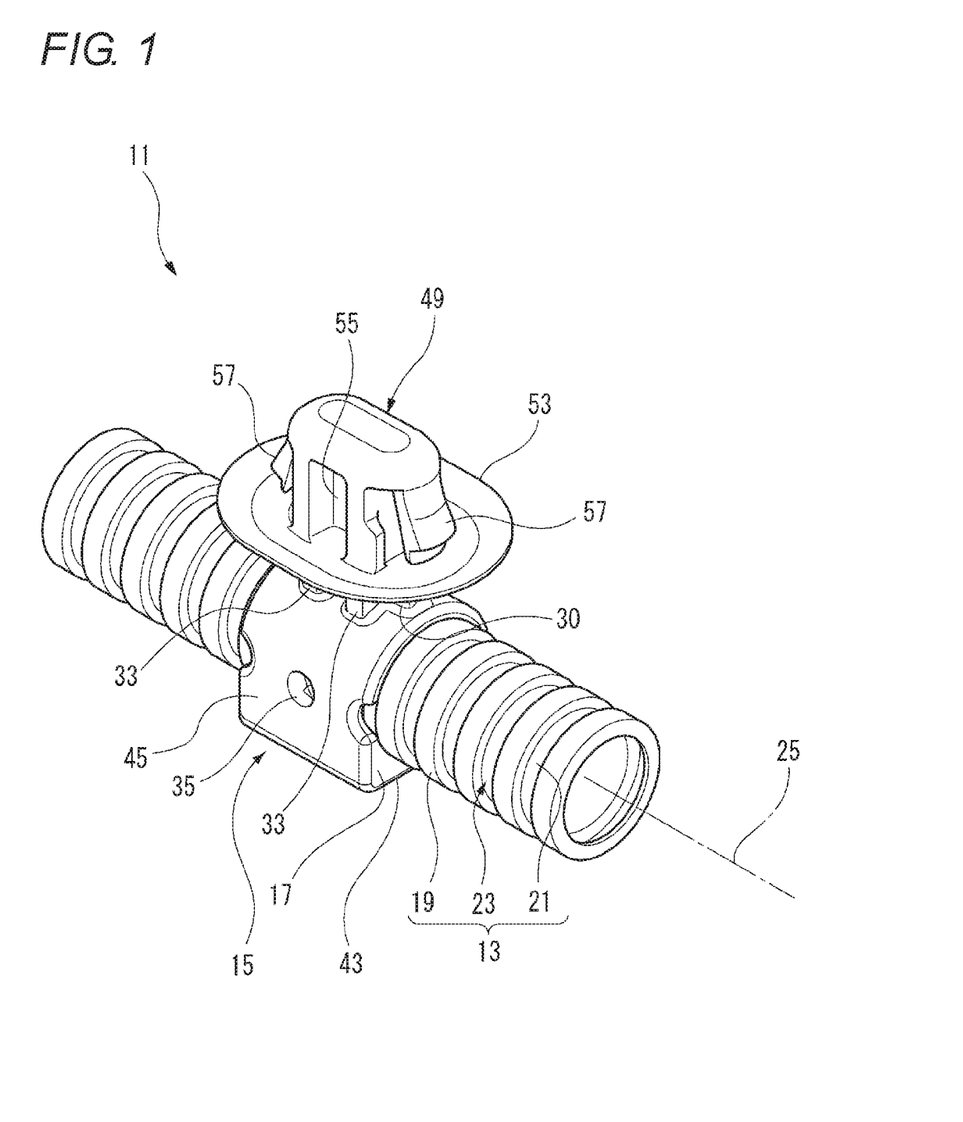
FIG. 1 is a perspective view of a wire protection member according to an embodiment of the invention.
Figure 2A:
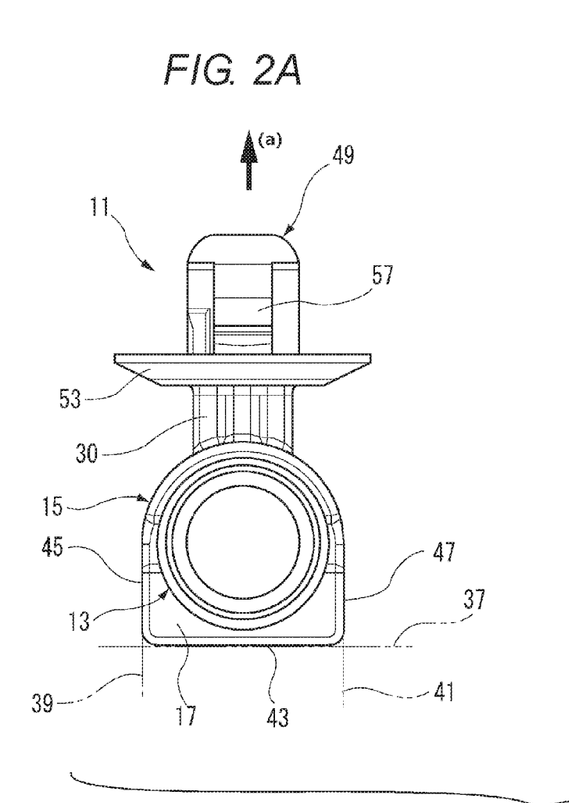
FIGS. 2A and 2B are a front view of the wire protection member shown in FIG. 1 and an enlarged side view in which a part of the wire protection member is cut away.
Figure 2B:
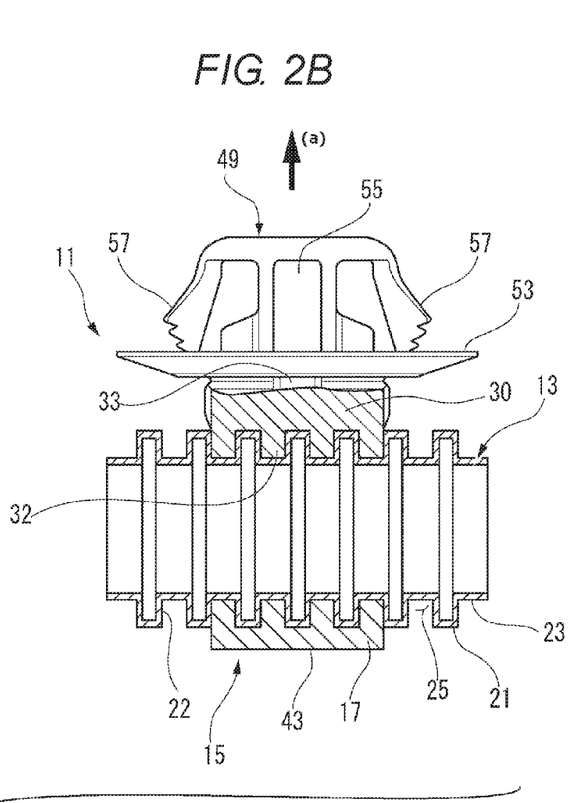

As shown in FIG. 1 and FIGS. 2A and 2B, a wire protection member 11 according to the embodiment of the invention includes a wire protection tube 13, a cylindrical covering member 15, a thick portion 17 and a flat surface 43.

The wire protection tube 13 according to the embodiment is made of an insulating synthetic resin material. The wire protection tube 13 has flexibility in terms of material and structure. In the wire protection tube 13, a plurality of large diameter portions 19 and a plurality of small diameter portions 21 are arranged alternately so that concave outer circumferential grooves 23 can be formed between adjacent ones of the large diameter portions 19 across each of the small diameter portions 21. Thus, the wire protection tube 13 is formed into a bellows-like shape with flexibility. That is, each of the large diameter portions 19 and the small diameter portions 21 can be elastically deformed in terms of material, while side wall portions 22 of the outer circumferential grooves 23 formed between the large diameter portions 19 and the small diameter portions 21 are vulnerable to a bending load. Thus, the wire protection tube 13 also has flexibility in terms of structure. A so-called corrugated tube is suitably used as the wire protection tube 13. Not to say, an elastic tube formed into a long cylindrical shape may be used as the wire protection tube according to the embodiment.

In addition, although a slit through which electric wires (not shown) can be inserted is not formed in the wire protection tube 13 according to the embodiment, it is a matter of course that such a slit may be formed along an axis 25 and all over the length of the wire protection tube 13.

The cylindrical covering member 15 according to the embodiment is made of an insulating synthetic resin material, and formed on the outer circumferential surface of the wire protection tube 13 by molding. Inner forming portions 32 (see FIG. 2B) are filled into at least a plurality (four in the embodiment) of the outer circumferential grooves 23 so as to be integrated with the wire protection tube 13. In the embodiment, the cylindrical covering member 15 is formed on the outer circumferential surface of a desired part of the wire protection tube 13 by molding so as to cover the outer circumferential grooves 23 together with the large diameter portions 19 adjacent thereto. The cylindrical covering member 15 is set and formed in a forming mold 31 (see FIG. 4), which will be described layer, together with the wire protection tube 13 by molding. Incidentally, the cylindrical covering member 15 is molded over at least two large diameter portions 19. Incidentally, when a slit is formed in the wire protection tube 13, a slit is also formed in the cylindrical covering member 15. Thus, the cylindrical covering member 15 can be opened into a C-shape in section.

A connection portion 30 is formed integrally with the cylindrical covering portions 15 according to the embodiment. The connection portion 30 is formed into an erect wall projecting outward in the radial direction of the cylindrical covering member 15 and extending along the axis 25 of the wire protection tube 13. That is, the cylindrical covering member 15 is connected to the connection portion 30 by a slight circumferential distance. Reinforcing ribs 33 are provided on the opposite side surfaces of the connection portion 30 so as to protrude vertically. The lower ends of the reinforcing ribs 33 are fixedly attached to parts of the outer circumference of the cylindrical covering member 15. In addition, punched holes 35 may be formed in the cylindrical covering member 15. When the punched holes 35 are provided, the cylindrical covering member 15 can be made lighter in weight within an extent causing no trouble of rigidity.

A locking tool 49 such as a clip is formed integrally with the connection member 30 of the cylindrical covering member 15. In the embodiment, the locking tool 49 includes an abutment plate 53, a shaft portion 55 and a pair of locking claws 57. The abutment plate 53 abuts against the circumferential edge of a mounting hole provided in a vehicle body panel (not shown). The shaft portion 55 protrudes vertically from the abutment plate 53. The locking claws 57 are open from the distal end side of the shaft portion 55 toward the abutment plate 53. In the locking tool 49, the abutment plate 53 is formed integrally with the upper end of the connection portion 30.

In the locking tool 49, the pair of locking claws 57 are closed, and the shaft portion 55 is inserted into the mounting hole. When the abutment plate 53 abuts against the vehicle body panel, the pair of locking claws 57 are opened on the back side of the vehicle body panel so that the vehicle body panel can be put between the locking claws 57 and the abutment plate 53. Thus, the locking tool 49 is locked to the vehicle body panel.

Further, the thick portion 17 is provided in the cylindrical covering member 15. The thicker portion 17 is formed in a circumferential direction of the cylindrical covering member 15 so as to be thicker in radial thickness than any other outer circumferential portion where at least the locking tool 49 is provided to protrude. A flat surface 43 is formed in the outer surface of the thick portion 17. The flat surface 43 is a flat surface extending substantially in parallel (which is not limited to a perfectly parallel state but may be a slightly inclined state) to a plane passing through the axis 25 of the wire protection tube 13. The outline of the thick portion 17 according to the embodiment is formed out of a first tangent 37 in contact with the outer circumference of the cylindrical covering member 15 and two tangents, that is, a second tangent 39 and a third tangent 41 perpendicular to the first tangent 37 and in contact with the cylindrical covering member 15 as shown in FIG. 2A. That is, the thick portion 17 is a solid part in which forming resin is filled into the inside surrounded by the outer circumference circle of the cylindrical covering member 15, the first tangent 37, the second tangent 39 and the third tangent 41. Incidentally, in the embodiment, the first tangent 37 may be a straight line moved in parallel with the outer circumference circle of the cylindrical covering member 15.

Thus, in the wire protection member 11 according to the embodiment, a flat surface 43 extending along the first tangent 37, a flat side surface 45 extending along the second tangent 39 and a flat side surface 47 extending along the third tangent are formed in the outer surface of the thick portion 17. That is, the thick portion 17 includes a pair of flat side surfaces 45 and 47 perpendicular to the flat surface 43 and in contact with the outer circumferential surface of the cylindrical covering member 15. Particularly, the flat surface 43 is a surface perpendicular to the direction in which the locking tool 49 is pressed (see the arrow (a) in FIGS. 2A and 2B). Not to say, the flat surface 43 and the flat side surfaces 45 and 47 are not limited to perfectly flat surfaces but may be curved surfaces or spherical surfaces that are curved slightly. That is, the flat surface 43 that is a flat surface substantially parallel to a plane passing through the axis 25 is not limited thereto but may be formed out of a curved surface or a spherical surface that is a gentle curved surface with smaller curvature than the outer diameter of each large diameter portion 19 of the wire protection tube 13.

Further, the flat surface 43 according to the embodiment is formed on the opposite side to the locking tool 49 across the axis 25 of the wire protection tube 13.

Next, a method for manufacturing the aforementioned wire protection member 11 will be described.

Figure 3:
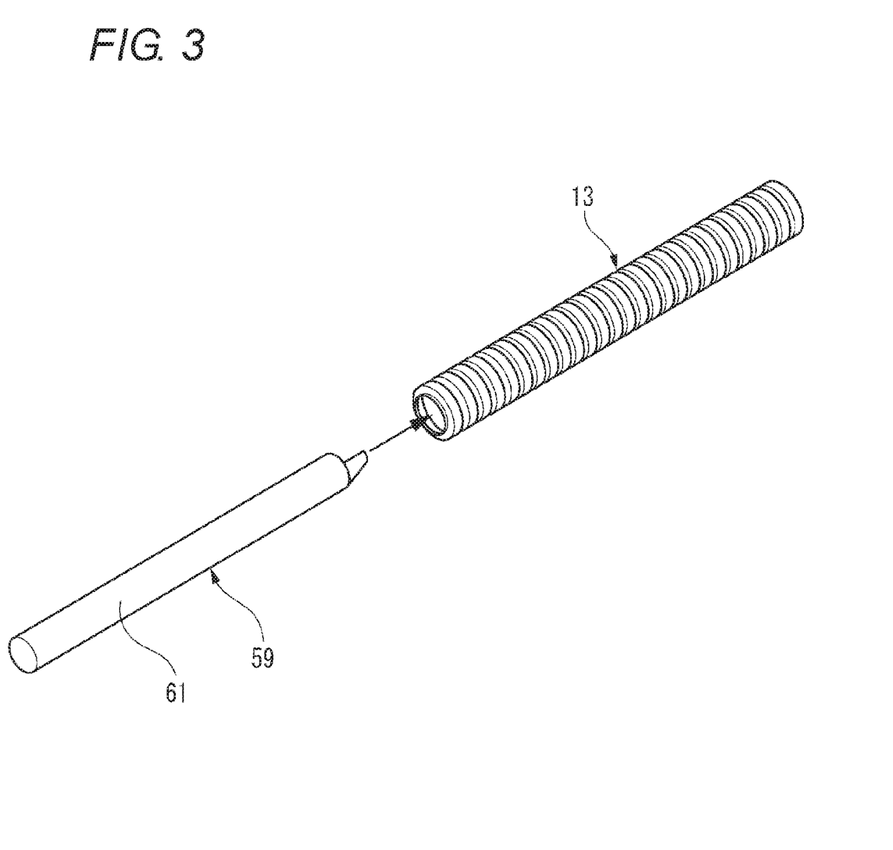
FIG. 3 is a perspective view of a wire protection tube and a core.

As shown in FIG. 3, in order to form the aforementioned wire protection member 11, a core 59 is first inserted into the wire protection tube 13.

The core 59 is constituted by a shaft body 61 that has a diameter substantially the same as the inner diameter of the wire protection tube 13 so that the shaft body 61 can be inserted into the wire protection tube 13. In the core 59, the shaft body 61 is inserted into the wire protection tube 13 that has not been set in the forming mold 31 yet. Thus, the wire protection tube 13 can be prevented from being crushed due to the injection pressure of forming resin reaching a high temperature.

Figure 4:
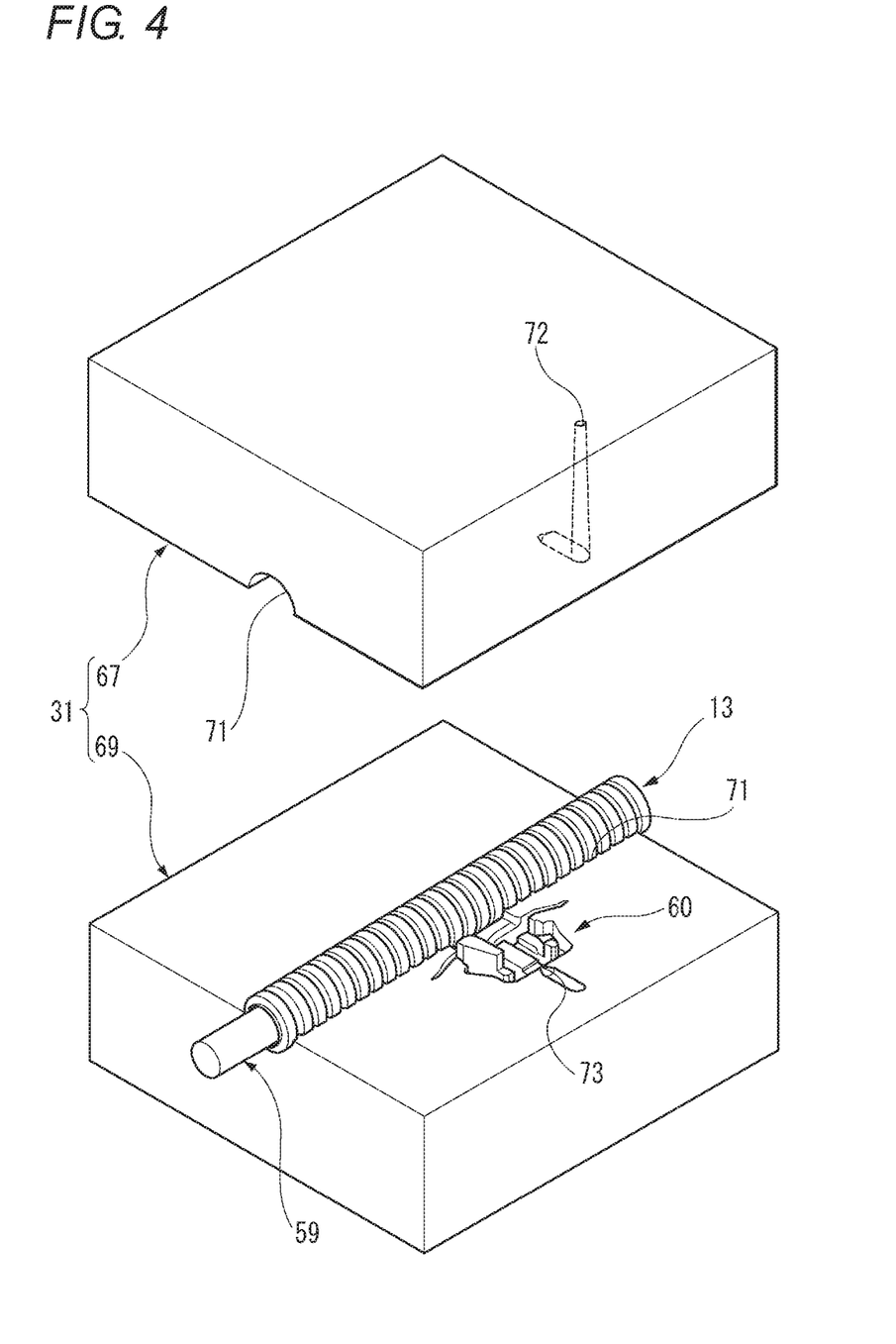
FIG. 4 is a perspective view showing a mold opening state of a forming mold in which the wire protection tube and the core have been set in a lower mold.

As shown in FIG. 4, the forming mold 31 includes an upper mold 67 and a lower mold 69, which are made of synthetic resin. The wire protection tube 13 to which the core 59 has been inserted is disposed in a wire protection tube receiving portion 71 between the upper mold 67 and the lower mold 69. The upper mold 67 and the lower mold 69 are clamped by a mold clamping device while setting the wire protection tube 13 therebetween. Therefore, a cavity 60 corresponding to the cylindrical covering member 15, the connection portion 30 and the locking member 49 is disposed between the wire protection tube 13 disposed inward and the inner surface of the wire protection tube receiving portion 71. In this state, molten thermoplastic resin is injected at low pressure from a supply path 72 of the upper mold 67 to the cavity 60 through a gate 73. When a predetermined amount of thermoplastic resin is supplied, the cavity 60 is filled with the thermoplastic resin. The thermoplastic resin is hardened. Thus, the cylindrical covering member 15, the connection portion 30 and the locking tool 49 having outer shapes corresponding to the shape of the inner surface of the cavity 60 are formed on the outer circumference of the wire protection tube 13 by molding.

Figure 5:
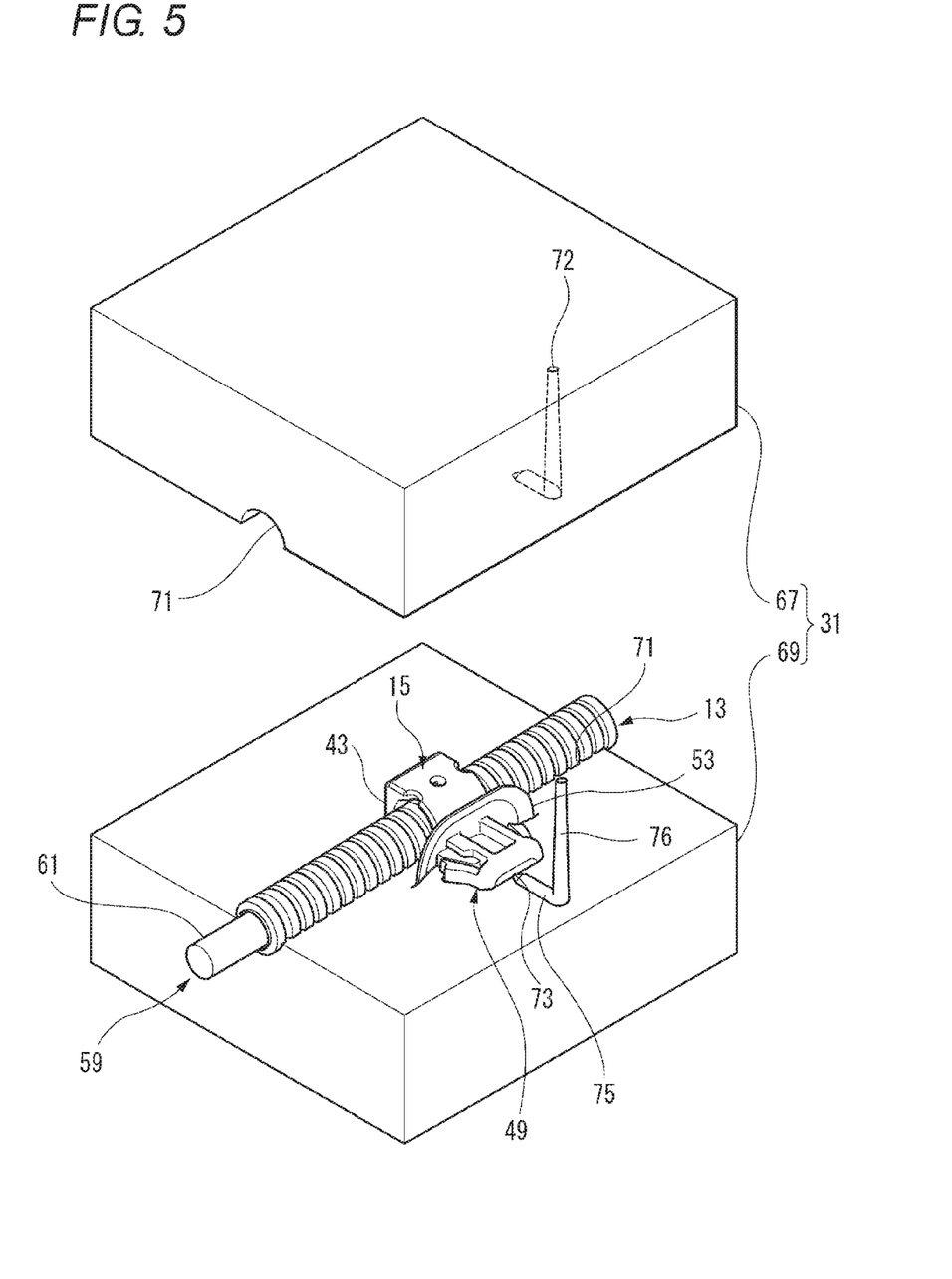
FIG. 5 is a perspective view of a mold opening state of the forming mold in which the wire protection member has been formed.

Then, as shown in FIG. 5, the upper mold 67 and the lower mold 69 of the forming mold 31 are opened, and the molded product is extracted therefrom. A sprue 76 and a runner 75 are removed from the gate 73. Thus, manufacturing the wire protection member 11 is completed. Incidentally, although the embodiment has been described in a case where the gate 73 for injecting the thermoplastic resin into the cavity 60 at low pressure is set at a front end of the locking tool 49, the gate 73 may be set on the flat surface 43 of the cylindrical covering member 15.

Figure 6:
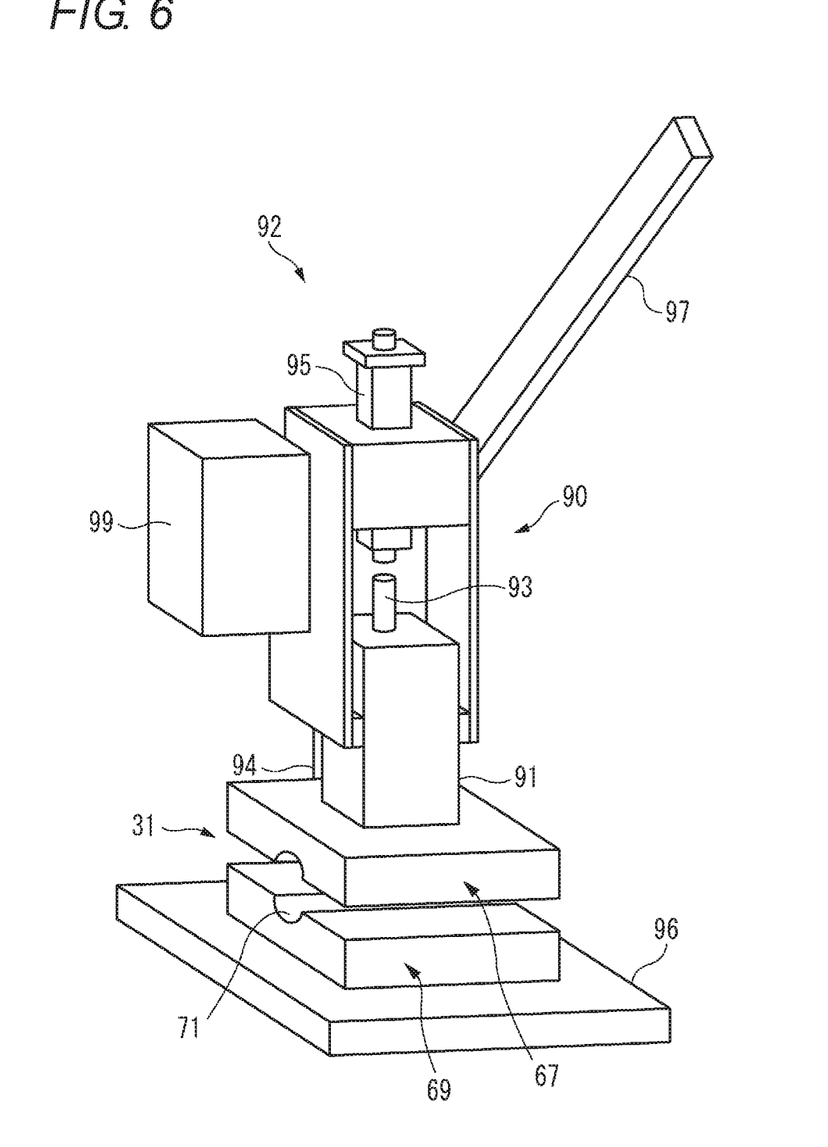
FIG. 6 is a perspective view of a micro molding machine.

Using a micro molding machine 92 shown in FIG. 6, the thermoplastic resin is injected into the cavity 60 inside the forming mold 31. The micro molding machine 92 is a resin molding machine that can be operated by one worker without using external power such as an electric motor. The micro molding machine 92 includes a mold clamping device (not shown) and a low pressure injection device 90. The upper mold 67 and the lower mold 69 are opened and closed by the mold clamping device. Molten resin is pressurized and injected into the forming mold 31 by the lower pressure injection device 90.

The low pressure injection device 90 includes a heating cylinder 91, a plunger 93, an injection cylinder 95, a handle 97 and a temperature controller 99, which are supported by a support 94 erectly provided on a pedestal 96. The heating cylinder 91 is provided with a heater for heating and melting synthetic resin such as polypropylene or the like. The plunger 93 injects the molten resin of the heating cylinder 91 from a not-shown nozzle. The injection cylinder 95 advances the plunger 93. The handle 97 drives the injection cylinder 95. The temperature controller 99 keeps the heating temperature of the heating cylinder 91 at a desired temperature.

Incidentally, according to the micro molding machine 92 referred to in the embodiment, resin can be molded up to an amount of about several tens of grams every shot of injection molding, and the forming mold 31 can be closed manually using an air cylinder, a link, etc. Incidentally, the low pressure injection device 90 may drive the injection cylinder 95 using external power such as an electric motor or an air. More specifically, a well-known "injection molding apparatus", for example, disclosed in JP-A-2010-260297, JP-A-2012-30429, JP-A-2013-103492, etc. may be used as the micro molding machine 92.

The forming mold 31 in the embodiment is disposed on the pedestal 96. In the forming mold 31, the upper mold 67 and the lower mold 69 are combined to put the wire protection tube 13 therebetween so that the wire protection tube 13 can be received in the wire protection tube receiving portion 71. Thus, the cavity 60 serves as a cavity capable of molding. Then, molten thermoplastic resin is supplied to the cavity from the supply path 72 through the sprue 76, the runner 75 and the gate 73. Thus, the cylindrical covering member 15 is formed on the outer circumference of the wire protection tube 13 by injection molding, and the wire protection member 11 is formed.

Incidentally, although the embodiment has been described on the assumption that the forming mold 31 is a horizontal split mold, the forming mold 31 may be a vertical split mold.

Next, the operation of the wire protection member 11 having the aforementioned configuration will be described.

In the wire protection member 11 according to the embodiment, the thick portion 17 is a solid part of forming resin filled into the inside surrounded by the outer circumference circle of the cylindrical covering member 15, the first tangent 37, the second tangent 39 and the third tangent 41. The thick portion 17 serves as a bearing wall so that the cylindrical covering member 15 provided with the thick portion 17 can be prevented from being easily crushed radially.

That is, in the thick portion 17, the radius connecting the intersection point between the first tangent 37 and the second tangent 39 with the center of the wire protection tube 13 and the radius connecting the intersection point between the first tangent 37 and the third tangent 41 with the center of the wire protection tube 13 are larger than that of any other outer circumferential portion of the cylindrical covering member 15. Only this large-radius part forms a substantially triangular shape along the axis 25 of the wire protection tube 13 and protrudes from the outer circumferential surface of the cylindrical covering member 15. Accordingly, enlargement of the cylindrical covering member 15 can be suppressed in comparison with the case where the cylindrical covering member 15 is thickened all over its circumference.

Further, the flat surface 43 that is a flat surface substantially parallel to a plane passing through the axis 25 of the wire protection tube 13 is formed in the outer surface of the thick portion 17. Accordingly, the thick portion 17 does not have an external shape protruding radially outward more than necessary. The flat surface 43 can be also used as a pressing surface with which the locking tool 49 is pressed into the mounting hole of the vehicle body panel or a seat surface with which the wire protection member 11 is wired on the vehicle body panel.

In addition, the thick portion 17 according to the embodiment includes the pair of flat side surfaces 45 and 47 perpendicular to the flat surface 43 and in contact with the outer circumferential surface of the cylindrical covering member 15. Thus, the thick portion 17 has a substantially rectangular shape in section. Therefore, the flat surface 43 and the flat side surfaces 45 and 47 of the thick portion 17 can be used as pressing surfaces or seat surfaces respectively.

In addition, in the wire protection member 11 according to the embodiment, the flat surface 43 is formed on the opposite side to the locking tool 49 across the axis 25 of the wire protection tube 13.

Accordingly, the flat surface 43 of the thick portion 17 is a surface perpendicular to the direction in which the locking tool 49 is pressed into the mounting hole of the vehicle body panel, so that the pressing-in force can efficiently act on the insertion force of the locking tool 49. As a result, the wire protection member 11 can be fixed to the vehicle body panel easily without crushing the wire protection tube 13.

Next, modifications of the wire protection member 11 according to the embodiment will be described.

Figure 7A:
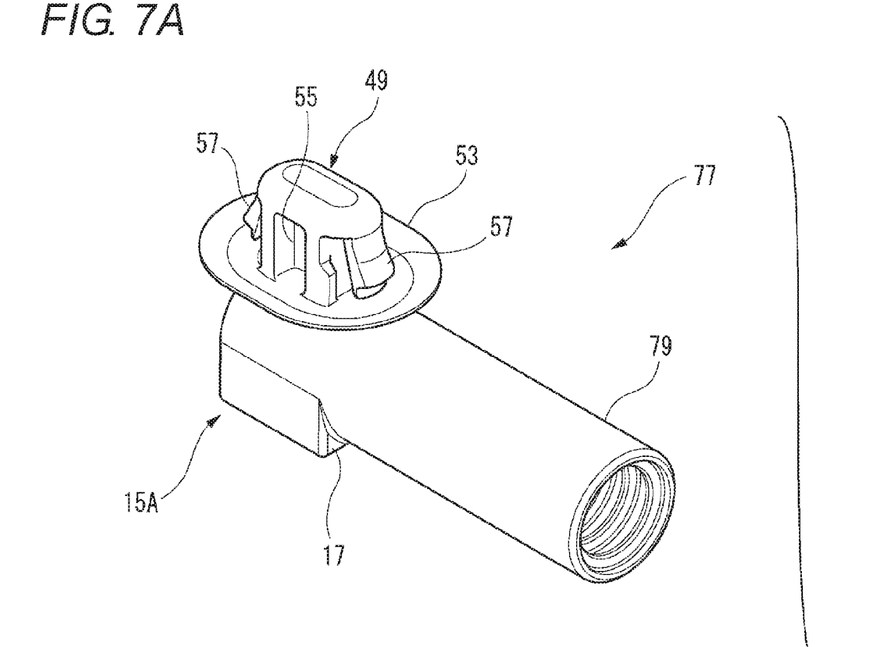
FIGS. 7A and 7B are a perspective view and a side view of a wire protection member according to a modification of a cylindrical covering member.
Figure 7B:
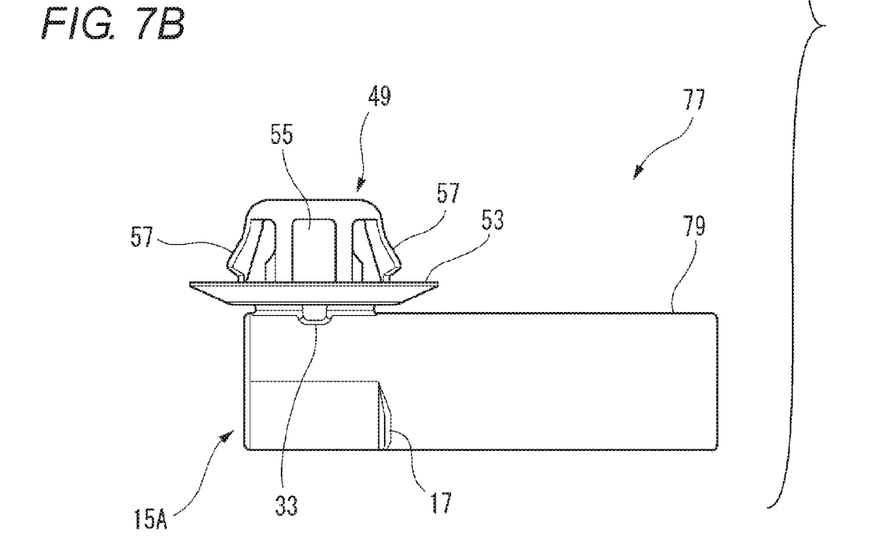

FIGS. 7A and 7B are a perspective view and a side view of a wire protection member 77 according to a modification in which a part of a cylindrical covering member 15A is extended axially.

In the wire protection member 77 according to the modification, only a cylindrical portion 79 is formed to further extend axially from the cylindrical covering member 15A provided with a thick portion 17. That is, the cylindrical portion 79 does not include the thick portion 17. The cylindrical portion 79 may be extended on either one end side or opposite end sides of the cylindrical covering member 15A.

According to the wire protection member 77 configured thus, the cylindrical portion 79 can be, for example, used as a protector.

Figure 8:
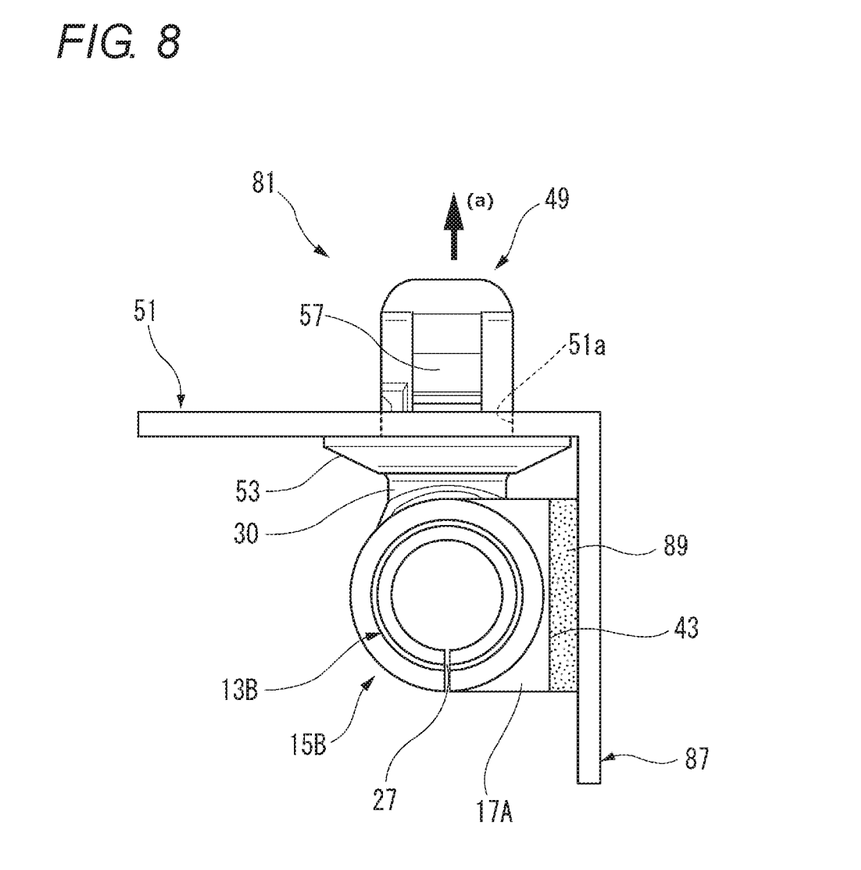
FIG. 8 is a schematic view showing a mounting state of a wire protection member according to another modification of a cylindrical covering member.

FIG. 8 is a schematic view in which a wire protection member 81 according to another modification is observed from a direction along an axis 25. In the modification, a flat surface 43 is formed as a surface parallel to a pressing-in direction of a locking tool 49.

The wire protection member 81 according to the modification includes a wire protection tube 13B in which a slit 27 is formed, a cylindrical covering member 15B in which a thick portion 17A is formed, and the locking tool 49. The flat surface 43 of the thick portion 17A is formed as a flat surface parallel to the pressing-in direction (the direction of the arrow (a) in FIG. 8) of the locking tool 49.

Accordingly, as shown in FIG. 8, when a vertical panel 87 perpendicular to a vehicle body panel 51 to which the locking tool 49 should be locked is, for example, provided closely to a mounting hole 51*a* of the vehicle body panel 51, the wire protection member 81 to which electric wires have been inserted can be wired so that the flat surface 43 of the thick portion 17A can face the vertical panel 87. Further, a cushioning material 89 or the like having cushioning properties may be pasted to the flat surface 43 of the thick portion 17A.

According to the wire protection member 81 configured thus, when the position where the locking tool 49 should be locked is close to the vertical panel 87, the flat surface 43 is aggressively brought into contact with the vertical panel 87 through the cushioning material 89 so that the cylindrical covering member 15B can be prevented from touching the vertical panel 87 to thereby generate abnormal noise due to vibration or the like during running.

Thus, according to the wire protection member 11, 77 or 81 according to the embodiment, the cylindrical covering member 15, 15A or 15B can be prevented from being enlarged, and prevented from being crushed easily.

Here, the aforementioned features of the embodiment of the wire protection member according to the invention will be summarized and listed in the following items respectively.

[1] A wire protection member 11 including: a flexible cylindrical wire protection tube 13; a cylindrical covering member 15 that is formed on an outer circumferential surface of the wire protection tube 13 by molding; and a locking tool 49 that is formed integrally with the cylindrical covering member 15 to allow the locking tool 49 to be locked to a mounting hole of a vehicle body panel, wherein the cylindrical covering member 15 includes: a thick portion 17 that is formed so as to be thicker in radial thickness than another outer circumferential portion in a circumferential direction on which at least the locking tool 49 is provided to protrude; and a flat surface or a gentle curved surface (flat surface) 43 that is formed in an outer surface of the thick portion 17 and that is substantially parallel to a plane passing through an axis 25 of the wire protection tube 13.

[2] A wire protection member 11 according to the aforementioned item [1], wherein the thick portion 17 includes a pair of flat side surfaces 45 and 47 that are perpendicular to the flat surface or the gentle curved surface (flat surface) 43 and in contact with the outer circumferential surface of the cylindrical covering member 15.

[3] A wire protection member 11 according to the aforementioned item [1] or [2], wherein the flat surface or the gentle curved surface (flat surface) 43 is formed on an opposite side to the locking tool 49 across the axis 25 of the wire protection tube 13.

Incidentally, the invention is not limited to the aforementioned embodiment, but suitable deformations, improvements and so on may be made thereon. In addition, materials, shapes, dimensions, numbers, arrangement places, etc. of constituent elements in the aforementioned embodiment are not limited but may be selected desirably if the invention can be attained.

According to a wire protection member of the present invention, it is possible to provide a wire protection member that can be prevented from easily crushed, without enlarging a cylindrical covering member.

What is claimed is:

1. A wire protection member comprising:
   a flexible cylindrical wire protection tube extending in a longitudinal direction;
   a cylindrical covering member that is formed on an outer circumferential surface of the wire protection tube by molding; and
   wherein the cylindrical covering member comprises:
   a locking tool formed integrally with the cylindrical covering member;
   a thick portion forming a first outer circumferential portion of the covering member, the thick portion having a minimum radial thickness thicker than a radial thickness of a second outer circumferential portion in a circumferential direction, the locking tool extending from the second outer circumferential portion, wherein the thick portion uniformly extends at least an entire length of the covering member in the longitudinal direction and has at least the minimum radial thickness throughout the entire length of the covering member; and
   a flat surface or a gentle curved surface that is formed in an outer surface of the thick portion and that is substantially parallel to a plane passing through an axis of the wire protection tube, wherein the flat surface or the gentle curved surface has a curvature less than a curvature of the flexible cylindrical wire protection tube.

2. The wire protection member according to claim 1, wherein the thick portion comprises a pair of flat side surfaces that are perpendicular to the flat surface or the gentle curved surface.

3. The wire protection member according to claim 1, wherein the flat surface or the gentle curved surface is formed on an opposite side to the locking tool across the axis of the wire protection tube.

4. The wire protection member according to claim 1, wherein the flat surface or the gentle curved surface extends between a first thick portion part and a second thick portion part in a direction perpendicular to the longitudinal direction and parallel to the plane passing through the axis of the wire protection tube, wherein first thick portion part and the second thick portion part are thicker in radial thickness than the flat surface or the gentle curved surface.

5. The wire protection member according to claim 1, wherein the flexible cylindrical wire protection tube includes a plurality of large diameter portions and a small diameter portion disposed between the plurality of large diameter portions in the longitudinal direction, and
wherein the thick portion overlaps the plurality of large diameter portions.

6. The wire protection member according to claim 1, wherein the locking tool is formed at a same position, in the longitudinal direction, on the covering member as the thick portion.

* * * * *